United States Patent [19]

Ertler

[11] Patent Number: 4,898,346
[45] Date of Patent: Feb. 6, 1990

[54] RESERVE PARACHUTE PACK WITH PILOT CHUTE

[76] Inventor: Stefan Ertler, Letzenbergstrasse 50, D-6914 Malschenberg, Fed. Rep. of Germany

[21] Appl. No.: 307,715

[22] Filed: Feb. 8, 1989

[30] Foreign Application Priority Data

Feb. 18, 1988 [DE] Fed. Rep. of Germany ....... 3805085

[51] Int. Cl.⁴ .............................................. B64D 17/70
[52] U.S. Cl. ..................................... 244/148; 244/147; 244/149
[58] Field of Search ......................... 244/147, 148, 149

[56] References Cited

U.S. PATENT DOCUMENTS

| 1,311,083 | 7/1919 | Moon ................................... 244/148 |
| 2,299,408 | 10/1942 | Quilter ................................ 244/149 |
| 2,352,721 | 7/1944 | Krahel ................................. 244/149 |
| 3,908,937 | 9/1975 | Poynter ............................... 244/148 |

FOREIGN PATENT DOCUMENTS

| 601815 | 3/1926 | France ................................ 244/148 |
| 284489 | 2/1928 | United Kingdom ................ 244/148 |
| 830556 | 3/1960 | United Kingdom ................ 244/149 |

Primary Examiner—Joseph F. Peters, Jr.
Assistant Examiner—Rodney Corl
Attorney, Agent, or Firm—Nixon & Vanderhye

[57] ABSTRACT

The reserve parachute is folded and disposed in a covering. A pilot chute overlies the reserve parachute outside of the covering. A disc overlies the pilot chute and bears against a compression spring maintained under compression by a single centrally positioned cord connected between the disc and a single release pin on the opposite side of the covering. The cord extends centrally through the compression spring and is connected centrally of the disc. Handling, packing and releasing of the reserve parachute and deployment of the pilot chute is thereby simplified.

20 Claims, 2 Drawing Sheets 4,898,346

RESERVE PARACHUTE PACK WITH PILOT CHUTE

BACKGROUND AND SUMMARY OF THE INVENTION

The present invention relates to a reserve parachute pack with pilot chute and particularly relates to a parachute pack constructed to facilitate the handling, packing and release for deployment of both the reserve parachute and the pilot chute.

Reserve parachute packs are well known, e.g., the system disclosed in U.S. Pat. No. 3,908,937, the disclosure of which is incorporated herein by reference. If the main parachute fails to deploy or function correctly during parachuting and is therefore cut away by the jumper, the reserve parachute must function. As well known, the initial opening of the reserve parachute is provided conventionally by a small pilot chute. The pilot chute is connected to the reserve parachute and has to deploy or open as quickly as possible when released. In prior systems, such as the one disclosed in U.S. Pat. No. 3,908,937, this is accomplished by a compression spring associated with the pilot chute. More particularly, upon actuation, the compression spring responds to project the pilot chute outwardly of the pack into the airstream passing the parachutist. Upon full deployment, the pilot chute pulls the reserve parachute out of its pack or container.

More particularly, the conventional design, as set forth in the above patent, features a pair of cords which extend from a cover for the pilot chute through the reserve parachute to terminate in a pair of loops projecting through the back of the pack. Two release pins are located along the back of the pack between the jumper and the pack and extend through the loops. Upon pulling the pins from the loops by a ripcord connected to a handle, the compression spring is released and simultaneously projects the pilot chute from the pack. Upon deployment of the pilot chute, the reserve parachute is pulled from the pack and deployed. This conventional design has many deficiencies, including inconvenience in handling and packing and the risk that the compression spring will tilt and thus not properly project the pilot chute from the pack.

In accordance with the present invention, there is provided a handling, packing and release system for the deployment of the reserve and pilot chutes which is not only greatly structurally simplified but results in greater safety and reliability in the opening of both chutes. Particularly, the present invention provides a single cord which extends substantially centrally through the pack, the reserve chute and the pilot chute, as well as centrally through the compression spring which ejects or projects the pilot chute from the parachute pack upon deployment in an accurate predetermined direction generally 90° relative to the pack. Additionally, there is provided a disc formed of rigid material which overlies the pilot chute on one side of the pack. One end of the cord is secured centrally of the rigid disc and extends through the spring, the pilot chute and the reserve chute, to terminate in a loop on the opposite side of the pack. A single release pin is inserted through the loop and cooperates with a grommet which serves as a keeper to maintain the spring under compression and, hence, the pilot chute and reserve chute in their packed, folded and undeployed condition in the parachute pack. The disc has preferably a concave inner surface and a convex outer surface. By using this configuration, the pilot chute and spring are maintained in centralized positions automatically. Also, by locating the single cord centrally of the disc, spring and pilot chute, the release of the cord by pulling the pin ensures that the spring exerts its force axially, i.e., in a direction generally perpendicular to the pack, to project the pilot chute in a like direction away from the pack reliably, consistently and repeatedly.

In accordance with a preferred embodiment of the present invention, there is provided a parachute pack, comprising a reserve parachute folded into an undeployed condition, a covering for the reserve parachute substantially enclosing the reserve parachute in its undeployed condition and a pilot chute folded into an undeployed condition and overlying the folded reserve parachute. Means are provided for deploying the pilot chute including a cover outside the covering for the reserve parachute. A compression spring is located outside the covering and is engageable with the cover. An element is attached to the cover and extends through the folded pilot chute, the folded reserve parachute and the covering, the element being secured to the cover substantially at its center and extending substantially centrally through the compression spring. The deploying means further include means for releasably securing the element to the side of the reserve parachute's covering opposite the cover to maintain the compression spring in a compressed condition whereby, upon release of the securing means, the compression spring may extend to displace the cover and free the folded pilot chute for deployment.

In accordance with a further preferred embodiment of the present invention, there is provided a parachute pack, comprising a reserve parachute folded into an undeployed condition, a covering for the reserve parachute substantially enclosing the reserve parachute in its undeployed condition and a pilot chute folded into an undeployed condition. Means are provided for deploying the pilot chute and include a substantially rigid member extending along one side of the pack for, in part, housing the pilot chute, a compression spring underlying and engageable with the member, and an element attached to the member and extending through the folded pilot chute and the folded reserve parachute to the opposite side of the pack from the member, the element being secured to the member substantially centrally thereof and extending substantially centrally through the compression spring. The deploying means further include means for releasably securing the element adjacent the opposite side of the pack to maintain the compression spring in a compressed condition whereby, upon release of the securing means, the compression spring may extend to displace said member and free the folded pilot chute for deployment.

It is therefore a primary object of the present invention to provide a novel and improved reserve parachute pack with pilot chute to facilitate the handling, packing and release for deployment of both the reserve parachute and the pilot chute.

By the foregoing described arrangement of using just one centrally disposed cord terminating in a loop and consequently only one single release pin, not only are the construction and handling simplified but the compression spring, when released, will expand almost exactly along its central longitudinal axis to project the pilot chute directly and orderly into the airstream passing the falling jumper, thus assuring proper opening of the reserve parachute.

These and further objects and advantages of the present invention will become more apparent upon reference to the following specification, appended claims and drawings.

BRIEF DESCRIPTION OF THE DRAWING FIGURES

FIG. 1 is a schematic, perspective cross-sectional view of a conventional reserve parachute with pilot chute; and FIG. 2 is a corresponding view of an embodiment of the reserve parachute pack with pilot chute according to the present invention.

DETAILED DESCRIPTION OF THE DRAWING FIGURES

Figure 1:
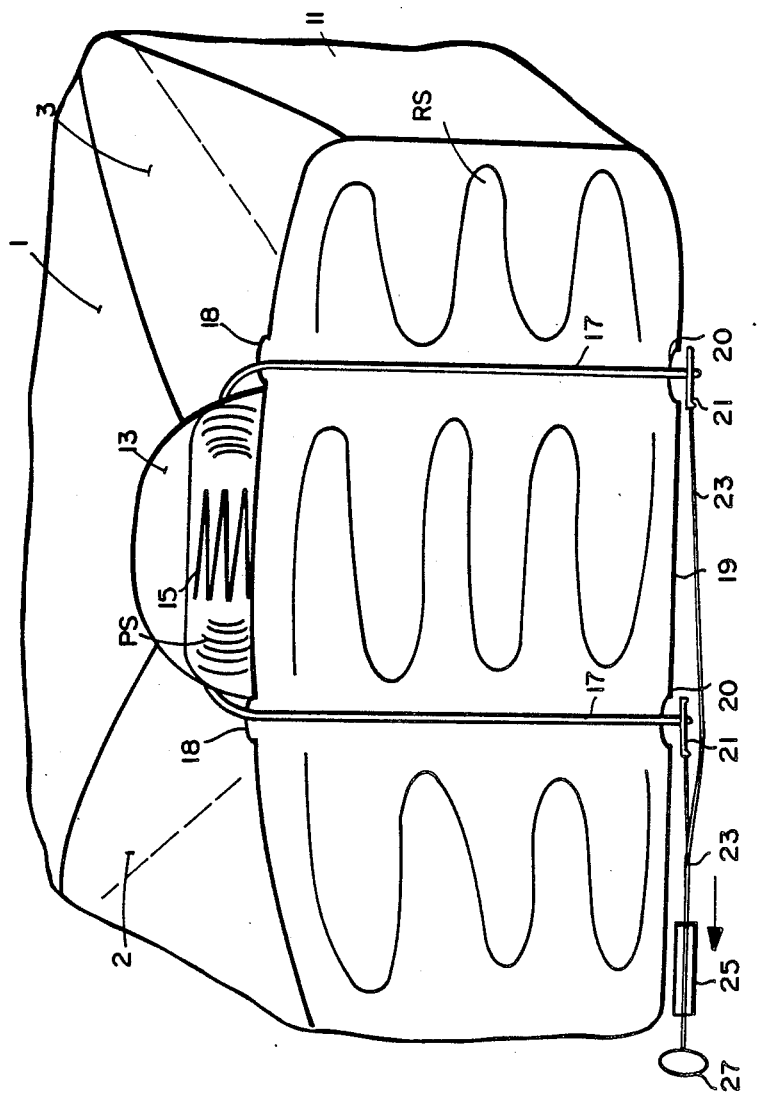
Figure 2:
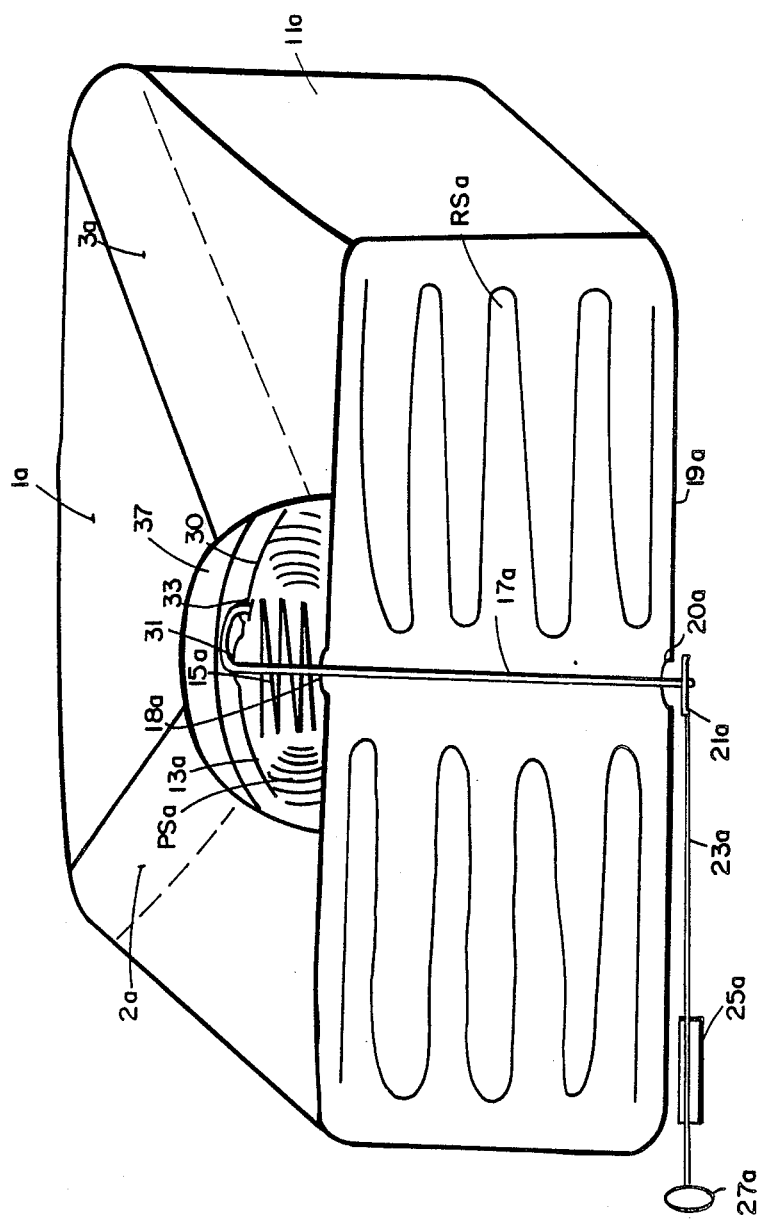

Reference will now be made in detail to a prior art parachute pack illustrated in FIG. 1 and a present preferred embodiment of the invention, an example of which is illustrated in FIG. 2. Turning now to FIG. 1, when packing a reserve parachute RS, four individual flaps, only three of which appear in drawing FIG. 1, are successively folded on top of the pack 11. First, flap 1 is folded from back to front (as illustrated) over the reserve parachute RS. Flap 2 is then folded from the left (as illustrated) followed by folding flap 3 from the right (as illustrated). The side edges of flap 1 are shown in dashed lines. On top of the closed pack 11, there is provided a folded pilot chute PS connected to the reserve parachute RS in pack 11 by means of suitable conventional devices, not shown, but mainly consisting of lines. A compressed compression spring 15 is located within the central portion of pilot chute PS. The pilot chute PS and the compression spring 15 underlie a cover 13. A cord 17 is fastened on each of the opposite sides of the cover 13. When packing this conventional pilot chute PS with the reserve parachute RS, the cords 17 are pulled through eyelets or grommets 18 in the flaps as well as through the folded reserve parachute RS towards the bottom 19 of container 11. At the bottom of the pack, the cords 17 pass through additional eyelets or grommets 20 in the pack and project to the outside of the pack terminating in loops. The loops of cords 17 are secured by two release pins 21. Pins 21 are attached to a common release cable 23 which leads through a cable housing 25 attached to pack 11 or its harness, not shown. The cable 23 leads to an activating handle 27.

When packing the reserve parachute RS, not only must it be folded and disposed within pack 11, but the pilot chute PS as well has to be packed. This is accomplished by pressing down on or compressing the compression spring cover 13 in order that the cords 17 can be passed through the pack starting from grommets 18 on its top down to its bottom 19. This is a rather troublesome, cumbersome and annoying procedure and cannot be done without special tools.

More particularly, flap 1 generally has two grommets 18 just like the opposite fourth flap, not shown, which also has two corresponding grommets. Both flaps 2 and 3 require a single grommet. Thus, the two cords 17 have to be pulled through a total of six grommets 18 on top of pack 11. Together with the two grommets 20 on the bottom 19 of the pack 11, the cords 17 must thus be pulled through altogether eight grommets before the release pins 21 can be placed to hold and secure the pack in an assembled ready condition. Furthermore, it is necessary to invert or turn the pack 11 over to obtain access to the bottom 19 to complete the packing process.

Both the cords 17 are fastened diametrically to the opposite sides of cover 13. They can also be made in one piece, i.e., a connecting piece between the two cords 17 could be sewn diametrically across cover 13. Thus, cover 13 together with the two cords 17 fix and stabilize the pilot chute in its packed condition and keeps the reserve parachute snug and folded with pack 11. In this undeployed condition, however, there is no way of detecting whether the cords 17 are fastened properly to cover 13 or whether weak spots have been caused by chafing which could result in the cords 17 breaking and enabling premature removal of the cover 13. In that case, the pilot chute PS would be opened unintentionally by the release of the compression spring 15. There is also no guarantee in this prior art parachute system that, in the undeployed closed condition, the cords 17 are positioned exactly 180° diametrically opposite and facing each other across the center of compression spring 15. Thus, when the release pins 21 are pulled out to release cords 17, there is a danger that the compression spring will tilt when it releases and consequently not project the pilot chute PS in the intended direction.

Also, because the cords 17 pass through two groups of grommets 18, there is virtually no possibility of fitting differently sized pilot chutes PS within the cover 13. Thus, very little, if any, compatibility with different pilot chutes, i.e., square or round reserve parachutes, is obtained.

FIG. 2 schematically illustrates the structure according to the present invention wherein similar parts as in the prior art embodiment are marked with the same reference numerals followed by the suffix a whereby a detailed repetition of the description of these parts is unnecessary.

Referring now to FIG. 2, there is provided only a single cord 17a disposed in the center of the pack 11a instead of the two cords 17 placed on the opposite sides of the cover 13 as in the prior art parachute system of FIG. 1. This single cord 17a extends centrally through the compression spring 15a towards the middle of cover 13a where it is anchored. In this form, however, cover 13a comprises a disc 30 formed of a rigid material as set forth below. Consequently, it is only necessary to pass cord 17a through one single group of grommets 18a on top of container 11a when packing the reserve parachute whereby, due to the central position of the cord 17 and disc 30, one single grommet is sufficient for each of the four flaps. Therefore, it is not necessary to use two grommets 18 on each flap 1a and the opposite facing fourth flap, not illustrated.

On the bottom 19a of pack 11a, there is, according to the embodiment of FIG. 2, only one single grommet 20a through which the cord 17a is disposed. Under the bottom 18a, the cord 17a terminates in a single loop which is secured by just one single release pin 21a. The release pin 17a is connected to an activating handle 27a via one single release cable 23a. The release pin 21a bears against grommet 20a which therefore acts as a keeper and part of the means for releasably securing the loop of cord 17a on the side of the pack 11a opposite disc 30.

Due to the central position of cord 17a through the compression spring 15a at its center, the compression spring 15a, when released, will expand substantially exactly along its longitudinal axis and eject the pilot chute PS in the predetermined intended direction, i.e., perpendicular to the flap side of pack 11a. Furthermore, due to the reduced number of eyelets or grommets 18a and 20a, folding and packing the reserve parachute RSa together with the pilot chute PSa are simplified and much easier whereby the handling of the assemblage is improved and simplified compared to the above-described conventional design of FIG. 1. By centrally locating the cord 17a vis-a-vis disc 30, a shifting to one side or a tilting of the centrally located compression spring is avoided when the spring is released. Compression spring 15a is maintained exactly in its predetermined position by the relatively stiff construction of the covering disc 30 coupled with its concave-convex surface configurations on its opposite sides. By changing the size of the covering disc 30, different pilot chutes PSa of different sizes can be fitted underneath the disc, since there is no lateral limitation to the packing space available. The whole arrangement can be packed and secured easily without use of any special tools.

Preferably, disc 30 consists of an arched covering cap to which the cord 17a is attached. Disc 30 may be formed of metal or a synthetic material. Preferably, a fiberglass reinforced synthetic material is used which is sufficiently stiff for fixing and stabilizing compression spring 15a but which, on the other hand, is light in weight. The disc 30 may be, but is not necessarily, connected to spring 15a of pilot chute PSa.

In the illustrated embodiment, cord 17a is passed from the inside of disc 30, i.e., its concave side, to its outside, i.e., its convex side, through a central eyelet or grommet 31 in disc 30. Upon passing outwardly through the disc, it is diverted to one side and passed through a second adjacent grommet 33 back to the inside of disc 30. On its return to the inside, cord 17a is anchored, e.g., by means of a button or knot which is bigger than the opening of the grommet 33.

Finally, disc 30 may be covered by an outer protective cap 37. This protective cap 37 can be flexible, e.g., made of textile, and may be padded as desired. Thus, shocks applied to pack 11a do not influence the proper arrangement of the folded pilot chute and do not impair its function. However, because protective cap 37 is removable in accordance with this invention, the cord 17a can easily be checked for its proper and undamaged securement to covering disc 30 without having to remove disc 30 itself or releasing the compression spring 15a. By means of disc 30, the pressure applied on compression spring 15a is distributed radially in a uniform manner so that a proper opening process is effected when release pin 21a is pulled to release cord 17a. Upon its release, cord 17a is then pulled outwardly of the pack by the compression spring 15a.

By the central arrangement of the cord 17a at disc 30, chafing of the cord 17a is avoided. The protection afforded cord 17a is improved by the removable protective cap 37. Thus, by removing cap 37, wear on the cord 17a can easily be detected. When the reserve parachute RSa is used, i.e., when pin 21a is pulled out and pilot chute PSa is released, the protective cap 37 will remain on top of the covering disc 30. Thus, protective cap 37 does not have to be removed from disc 30 before jumping.

In comparison to the conventional design according to FIG. 1, the present invention provides a substantial simplification in construction, easier handling while packing, a more precise stabilization of the compression spring 15a in undeployed conditions of the chutes, a better and more accurately directed expansion of the compression spring 15a when released with the result of a better ejection or projection of pilot chute PSa and also a simplified and safer release because only one single release pin 21a has to be pulled out.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A parachute pack, comprising:
    a reserve parachute folded into an undeployed condition;
    a covering for said reserve parachute substantially enclosing said reserve parachute in its undeployed condition;
    a pilot chute folded into an undeployed condition and overlying said folded reserve parachute;
    means for deploying said pilot chute including a cover outside said covering for said reserve parachute, a compression spring located outside said covering and engageable with said cover, and an element attached to said cover and extending through said folded pilot chute, said folded reserve parachute and said covering, said element being secured to said cover substantially at its center and extending substantially centrally through said compression spring;
    said deploying means further including means for releasably securing said element to the side of the reserve parachute's covering opposite said cover to maintain said compression spring in a compressed condition whereby, upon release of said securing means, said compression spring may extend to displace said cover and free said folded pilot chute for deployment.

2. A parachute pack according to claim 1 wherein said securing means includes a keeper and a single release pin releasably engageable with said element and said keeper whereby, upon release of said pin from said keeper, said element is free for movement under the action of said spring.

3. A parachute pack according to claim 1 wherein said cover is formed of a substantially rigid material.

4. A parachute pack according to claim 3 wherein said cover is formed of metal.

5. A parachute pack according to claim 4 wherein said cover is formed of a glass fiber reinforced synthetic material.

6. A parachute pack according to claim 1 wherein said element is flexible, said cover having a central opening, said element passing through said central opening from the inside to the outside thereof and terminating in a free end thereof, and means carried by said cover and displaced from said cover opening for securing the free end of said element to said cover.

7. A parachute pack according to claim 6 wherein said securing means carried by said cover includes a grommet, said element passing through said grommet from the outside of said cover to the inside thereof for securement on the inside of said cover.

8. A parachute pack according to claim 1 wherein said cover comprises a disc having opposite concave and convex surfaces, said concave surface opening on the side of said disc in opposition to said spring, said pilot chute in said folded undeployed condition thereof substantially surrounding said spring.

9. A parachute pack according to claim 1 including a removable flexible cap overlying said cover.

10. A parachute pack according to claim 9 wherein said cap comprises protective padding.

11. A parachute pack, comprising:
a reserve parachute folded into an undeployed condition;
a covering for said reserve parachute substantially enclosing said reserve parachute in its undeployed condition;
a pilot chute folded into an undeployed condition;
means for deploying said pilot chute including a substantially rigid member extending along one side of said pack for, in part, housing said pilot chute, a compression spring underlying and engageable with said member, and an element attached to said member and extending through said folded pilot chute and said folded reserve parachute to the opposite side of said pack from said member, said element being secured to said member substantially centrally thereof and extending substantially centrally through said compression spring;
said deploying means further including means for releasably securing said element adjacent said opposite side of the pack to maintain said compression spring in a compressed condition whereby, upon release of said securing means, said compression spring may extend to displace said member and free said folded pilot chute for deployment.

12. A parachute pack according to claim 11 wherein said securing means includes a keeper and a single release pin releasably engageable with said element and said keeper whereby, upon release of said pin from said keeper, said element is free for movement under the action of said spring.

13. A parachute pack according to claim 11 wherein said member is formed of a substantially rigid material.

14. A parachute pack according to claim 13 wherein said member is formed of metal.

15. A parachute pack according to claim 14 wherein said member is formed of a glass fiber reinforced synthetic material.

16. A parachute pack according to claim 11 wherein said element is a flexible cord, said member having a central opening, said cord passing through said central opening from the inside to the outside thereof and terminating in a free end thereof, and means carried by said member and displaced from said member opening for securing the free end of said cord to said cover.

17. A parachute pack according to claim 16 wherein said securing means carried by said member includes a grommet, said cord passing through said grommet from the outside of said member to the inside thereof for securement on the inside of said member.

18. A parachute pack according to claim 11 wherein said member comprises a disc having opposite concave and convex surfaces, said concave surface opening on the side of said disc in opposition to said spring, said pilot chute in said folded undeployed condition thereof substantially surrounding said spring.

19. A parachute pack according to claim 11 including a removable flexible cap overlying said cover.

20. A parachute pack according to claim 19 wherein said cap comprises protective padding.

* * * * *